US009009007B2

(12) United States Patent
Ali et al.

(10) Patent No.: US 9,009,007 B2
(45) Date of Patent: Apr. 14, 2015

(54) SIMULATING STREAM COMPUTING SYSTEMS

(75) Inventors: Shoukat Ali, Dublin (IE); Konstantinos Katrinis, Dublin (IE); Eugen Schenfeld, South Brunswick, NJ (US); Cheng-hong Li, Princeton, NJ (US); Alfred Park, Oak Ridge, TN (US); Deepak Ajwani, Cork (IE)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 13/418,484

(22) Filed: Mar. 13, 2012

(65) Prior Publication Data

US 2013/0247052 A1    Sep. 19, 2013

(51) Int. Cl.
*G06F 7/60* (2006.01)
*G06F 17/10* (2006.01)
*G06F 9/44* (2006.01)

(52) U.S. Cl.
CPC ........................................ *G06F 8/30* (2013.01)

(58) Field of Classification Search
CPC .......................................................... G06F 8/30
USPC .............................................................. 703/2
See application file for complete search history.

(56) References Cited

U.S. PATENT DOCUMENTS

| | | | |
|---|---|---|---|
| 6,292,822 B1 | 9/2001 | Hardwick | |
| 6,728,205 B1* | 4/2004 | Finn et al. | 370/217 |
| 7,668,665 B2* | 2/2010 | Kim | 702/33 |
| 7,685,141 B2* | 3/2010 | Jadhav et al. | 707/999.1 |
| 2005/0243736 A1* | 11/2005 | Faloutsos et al. | 370/254 |
| 2009/0327492 A1 | 12/2009 | Anderson et al. | |
| 2010/0083194 A1* | 4/2010 | Bagherjeiran et al. | 716/2 |
| 2010/0106946 A1 | 4/2010 | Imaki et al. | |
| 2011/0055519 A1 | 3/2011 | Schenfeld et al. | |

FOREIGN PATENT DOCUMENTS

WO    2009083110 A1    7/2009

OTHER PUBLICATIONS

Kao et al. A User-Oriented Synthetic Workload Generator, Distributed Computer Systems, 1992, Proceedings of the 12th International Conference, Jun. 12, 1992.
Anderson et al., Sword: Scalable and Flexible Workload Generator for Distributed Data Processing Systems, Proceedings of the 2006 Winter Simulation Conference.
Abadi et al., Aurora: A New Model and Architecture for Data Stream Management, the VLDB Journal, 12(2):120{139, 2003.
Arasu et al., Linear Road: A Stream Data Management Benchmark, in VLDB'04, Proceedings of the Thirtieth International Conference on Very Large Data Bases, pp. 480{491. VLDB Endowment, 2004.

(Continued)

*Primary Examiner* — Aniss Chad
(74) *Attorney, Agent, or Firm* — Ryan, Mason & Lewis, LLP

(57) ABSTRACT

A method, an apparatus and an article of manufacture for generating a synthetic workload for stream computing. The method includes generating an undirected graph that meets a node degree distribution parameter, obtaining a user-defined parameter for at least one feature for at least one stream computing application, and manipulating the undirected graph to generate a synthetic workload for stream computing in compliance with the user-defined parameter for the at least one feature for the at least one stream computing application.

23 Claims, 11 Drawing Sheets

(56) References Cited

OTHER PUBLICATIONS

Bouillet et al., Distributed Multi-Layered Workload Synthesis for Testing Stream Processing Systems, In Winter Simulation Conference 2008 (WSC 2008), pp. 1003{1011, 2008.

Cordeiro et al., Random Graph Generation for Scheduling Simulations, In Proceedings of the 3rd International ICST Conference on Simulation Tools and Techniques (SIMUTools '10), pp. 60:1{60:10, 2010.

Gedik et al., SPADE: The System S Declarative Stream Processing Engine, In SIGMOD '08, Proceedings of the 2008 ACM SIGMOD International Conference on Management of Data, pp. 1123{1134, New York, NY, USA, 2008. ACM.

Harchol-Balter et al., Exploiting Process Lifetime Distributions for Dynamic Load Balancing, ACM Transactions on Computer Systems, 15(3):253{285, Aug. 1997.

Shivaratri et al., Load Distributing for Locally Distributed Systems, IEEE, Dec. 1992, pp. 33-44.

Lassnig et al., Identification, Modelling and Prediction of Non-Periodic Bursts in Workloads, in 2010 10th IEEE/ACM International Conference on Cluster, Cloud and Grid Computing (CCGrid), pp. 485{494, 17-20 2010.

Mansour et al., Streamgen: A Workload Generation Tool for Distributed Information Flow Applications, in ICPP '04, Proceedings of the 2004 International Conference on Parallel Processing, pp. 55{62, Washington, DC, USA, 2004. IEEE Computer Society.

Mehra et al., Physical-Level Synthetic Workload Generation for Load-Balancing Experiments, in Proceedings of the First International Symposium on High-Performance Distributed Computing, 1992, (HPDC-1), pp. 208{217, 1992.

Ray et al., Robust Location Detection in Emergency Sensor Networks, in the 22nd Annual Joint Conference of the IEEE Computer and Communications Societies (INFOCOM 2003), Apr. 2003.

Rixner, Stream Processor Architecture, Kluwer Academic Publishers, 2002.

Thies et al., An Empirical Characterization of Stream Programs and its Implications for Language and Compiler Designer, in International Conference on Parallel Architectures and Compilation Techniques, Vienna, Austria, Sep. 2010.

Veloso et al., A Hierarchical Characterization of a Live Streaming Media Workload, IEEE/ACM Transactions on Networking, 14(1):133{146, Feb. 2006.

Viger et al., Efficient and Simple Generation of Random Simple Connected Graphs with Prescribed Degree Sequence, in Computing and Combinatorics Conference 2005 (COCOON '05), 2005.

Zhang et al., Workload Characterization for Operator-Based Distributed Stream Processing Applications, in DEBS'10: Proceedings of the Fourth ACM International Conference on Distributed Event-Based Systems, pp. 235{247, 2010.

\* cited by examiner

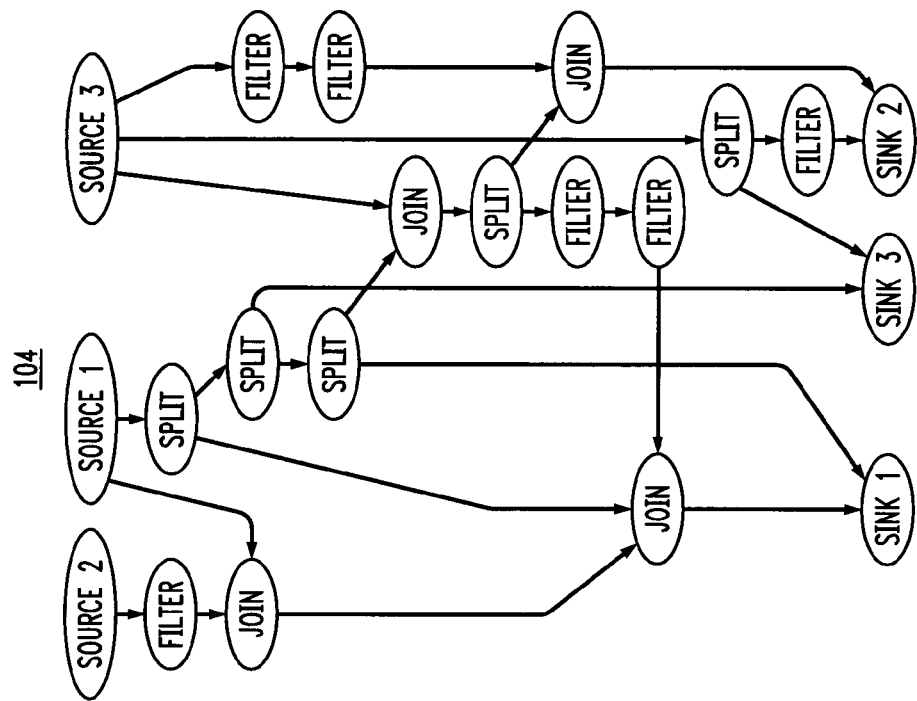
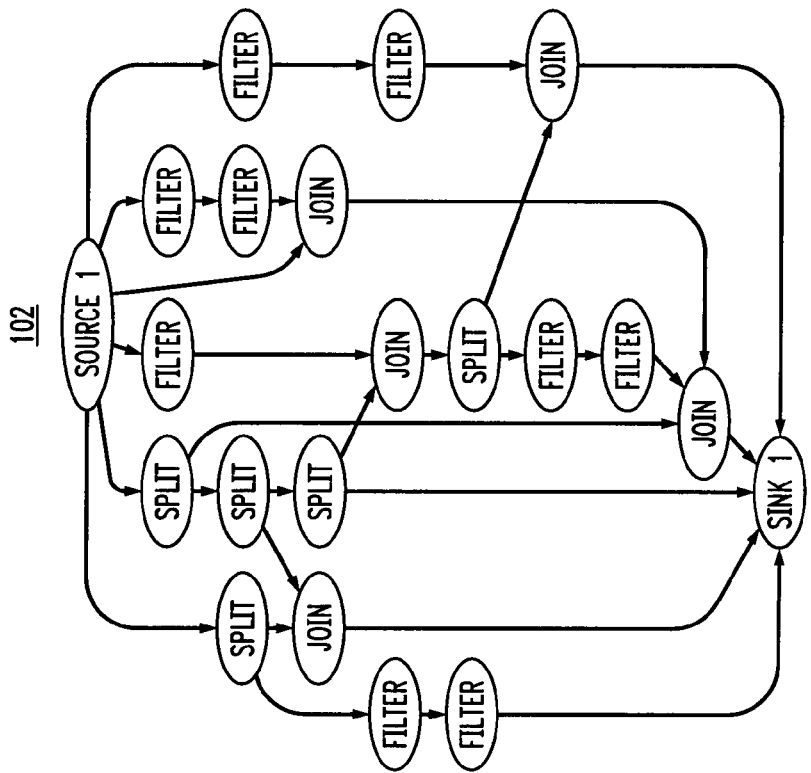
FIG. 1

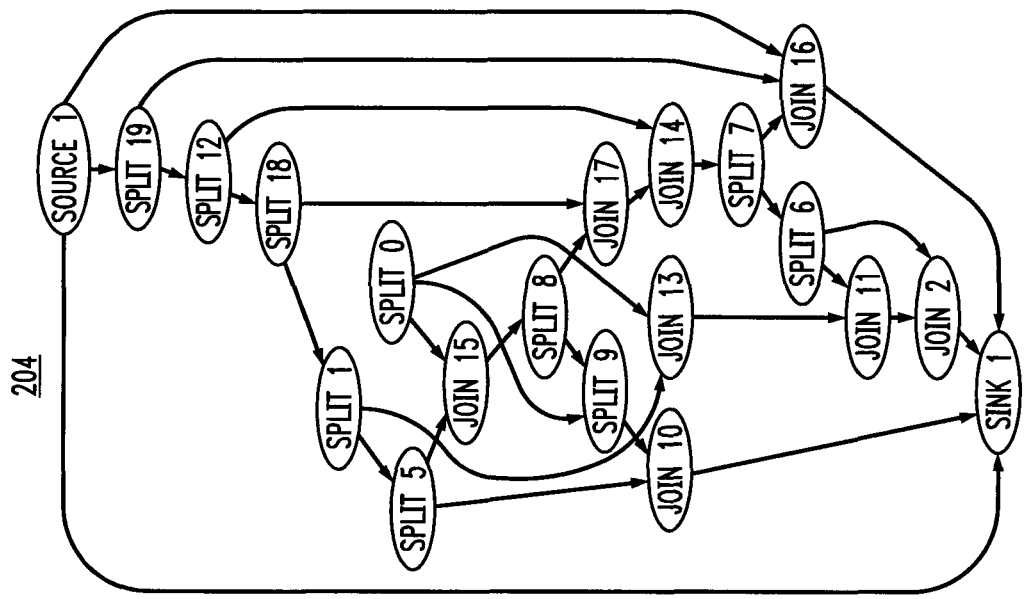
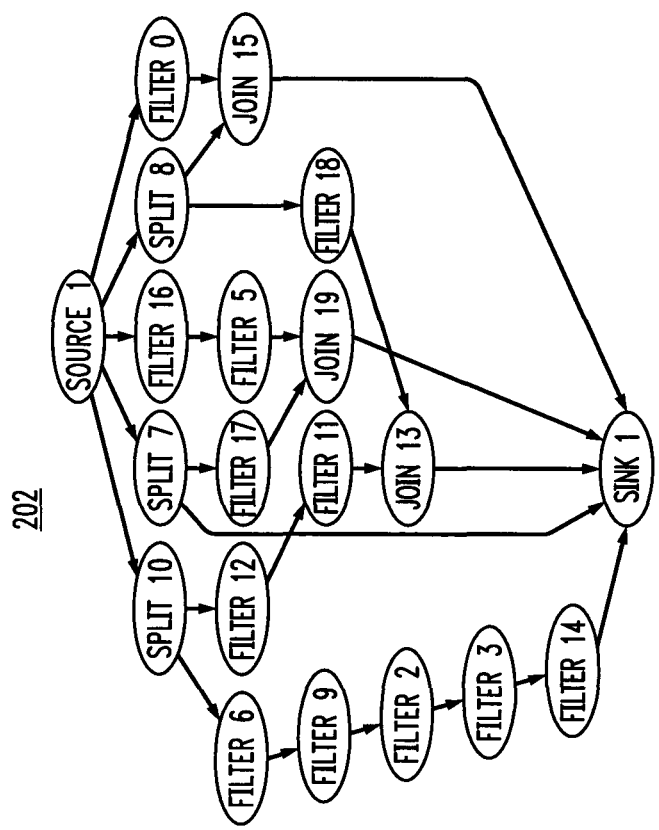
FIG. 2

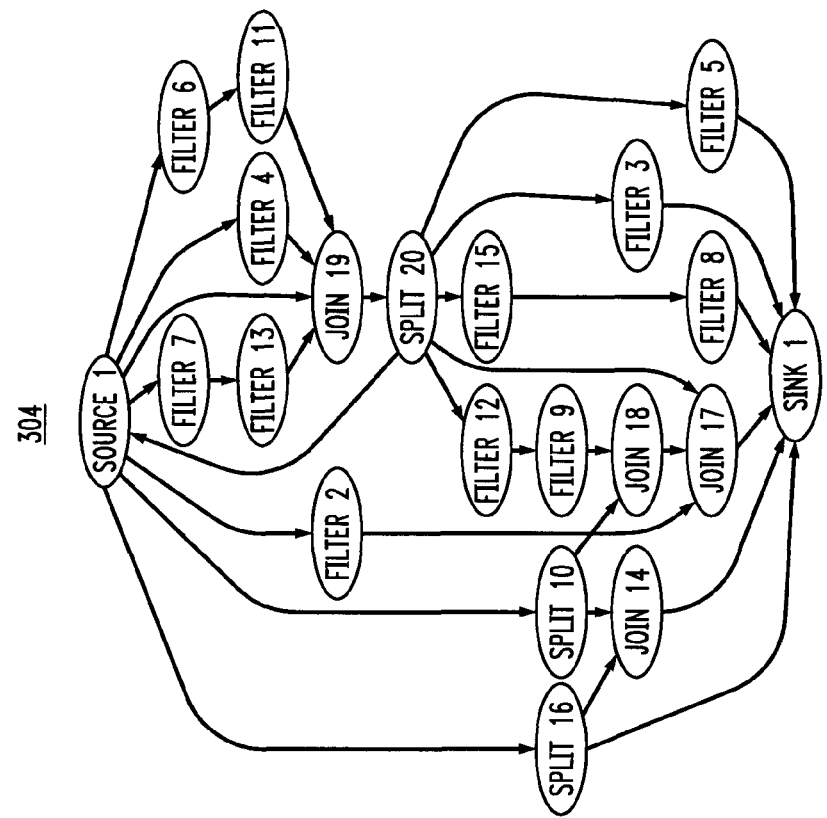
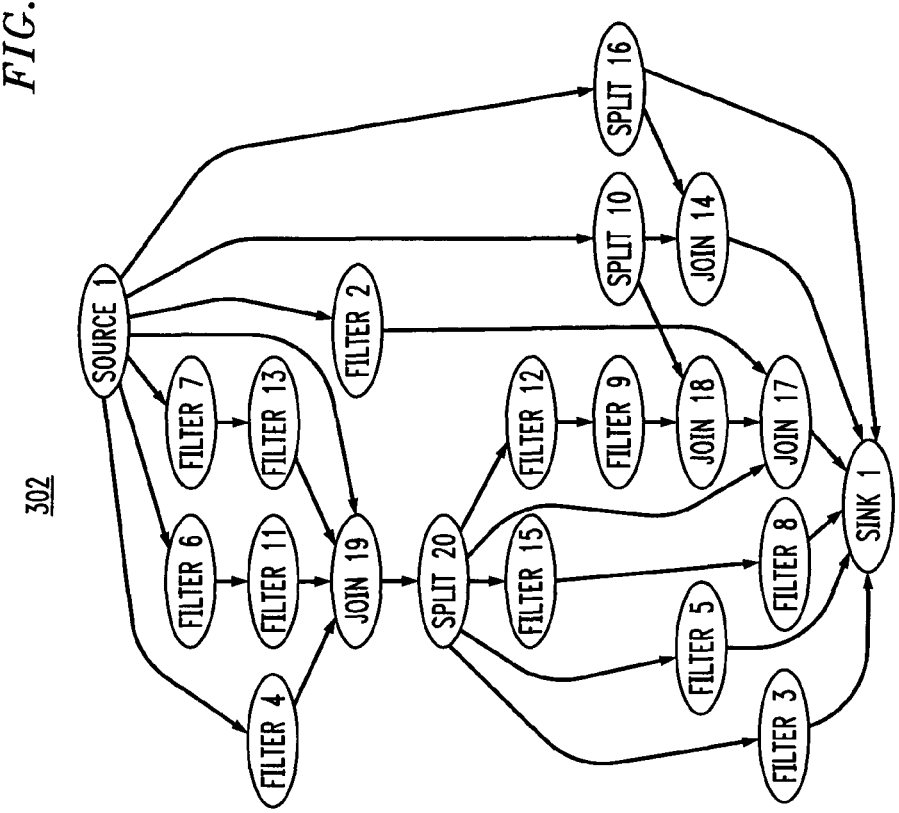
FIG. 3

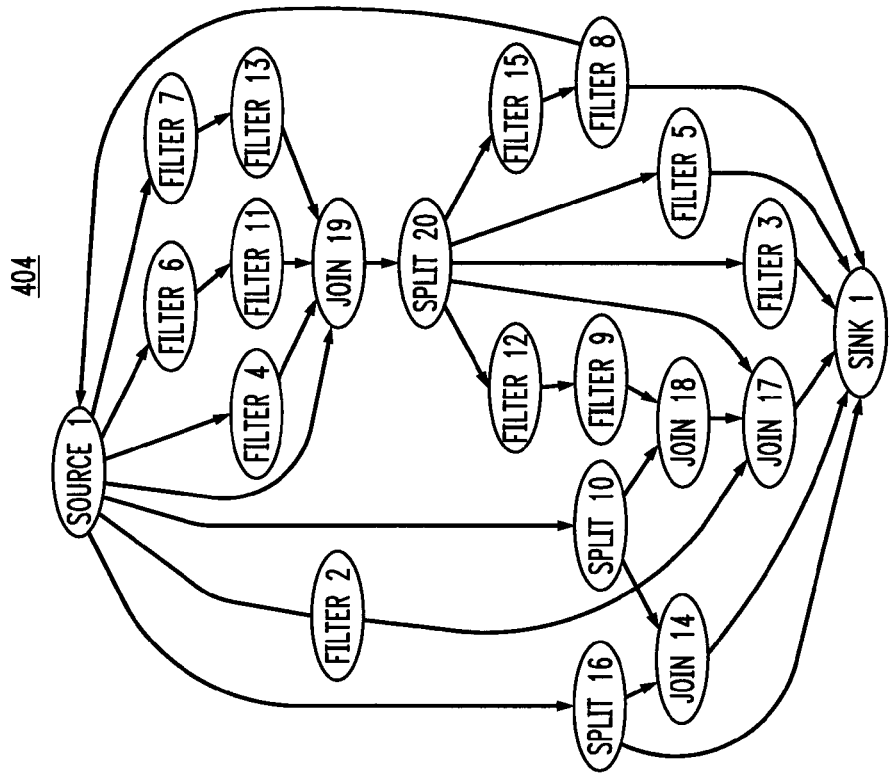
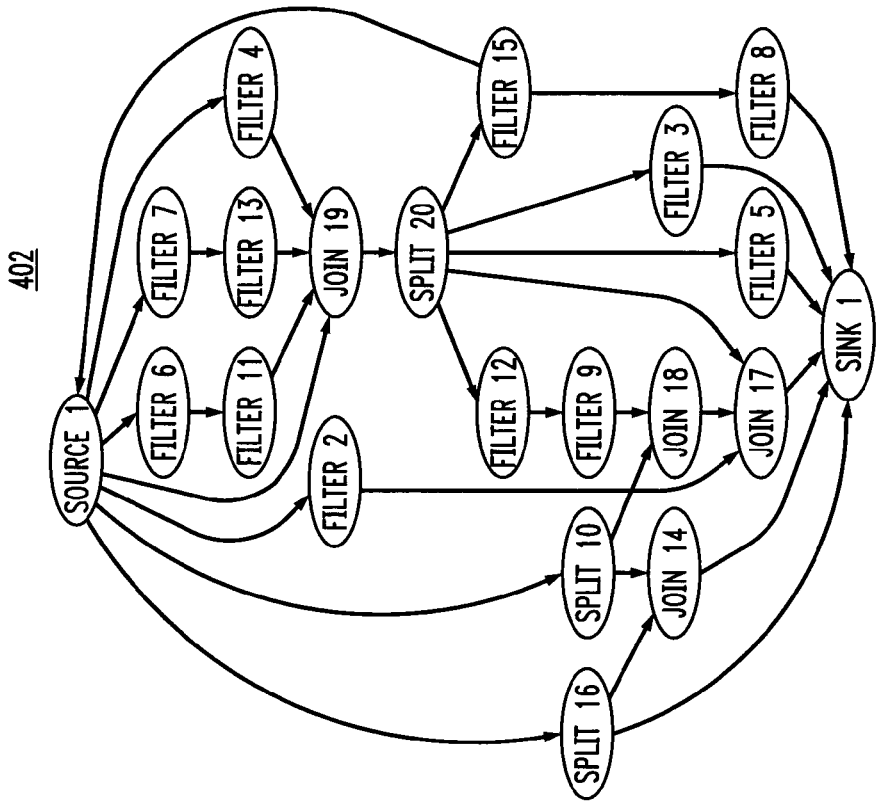
FIG. 4

Procedure 1: findCycles($\mathcal{G}, L, s$) The procedure for finding if a graph $\mathcal{G}$ contains a cycle of length $L$. All cycles of length $L$ are returned. All cycles of length not equal to $L$ are removed by removing an appropriate edge.

Input: A graph $\mathcal{G}$, required cycle length $L$, root vertex $s$.
Output: A possibly modified graph $\mathcal{G}$ and a list of cycles of length $L$.
1: Let $C$ be an empty list of cycles.
2: Use depth first search rooted at vertex s to find $\mathcal{B}$, the set of all back edges.
3: if $\mathcal{B}$ is not empty then
4:     for each back edge $(x,y) \in \mathcal{B}$ do
5:         Determine the set of simple paths $\mathcal{P}$ that run from vertex $y$ to $x$ by running a modified version of DFS. In the modified version, the DFS is abandoned once vertex $y$'s finish time is recorded (i.e., $y$ is colored black).
6:         for each simple path $p$ in $\mathcal{P}$ do
7:             if length $(p) = L$ then
8:                 Store $p$ in $C$.
9:             else
10:                Remove the back edge $(x,y)$
11:             end if
12:         end for
13:     end for
14: end if
15: return $C$.

Procedure 2: addBackedge($\mathcal{G}$, $L$, $s$) The procedure for adding an edge in an acyclic graph $\mathcal{G}$ to produce a cycle of length $L$.

Input: An acyclic graph $\mathcal{G}$, required cycle length $L$, root vertex $s$.
Output: A possibly modified graph $\mathcal{G}$, that might have a cycle of length $L$.
1: Ensure that $\mathcal{G}$ has as many connected components as the number of vertices
   (i.e., ensure that there are no cycles).
2: Determine the longest path $p(s, y)$ from vertex $s$ to every other vertex $y$ using
   a modified version of shortest paths algorithm. Let the set of longest paths be called
   $\mathcal{P}^{longest}$. The modification simplifies the algorithm because all edge weights are 1
   and there are no cycles.
3: if $\max_{\text{all } y \in \text{ vertex set}} \text{length}(p(s,y)) < L$ then
4:     $L = \max_{\text{all } y \in \text{ vertex set}} \text{length}(p(s,y))$
5: end if
6: if there is a path $p(s, z) \in \mathcal{P}^{longest}$ such that its length is $L$ and in-degree($z$) = 1 then
7:     Add a back edge from $z$ to $s$ to create a cycle of length $L$
8: end if
9: return

| |
|---|
| Procedure 3: assignDirections The procedure for converting a given undirected graph into a directed graph. |
| Input: An undirected graph and user specifications for $^1S^n$ (the percentage of nodes that split $n$ given input stream into $n$ output streams) and $^nJ^1$ (the percentage of nodes that join $n$ input streams into 1 output stream). <br> Output: A directed graph that tries to meet the user specifications for $^1S^n$ and $^nJ^1$. <br> 1:   create an empty queue $Q$ <br> 2:   create an empty binary search tree $B$ with key/value pair set to node/(in degree + out degree) <br> 3:   for each source $s$ do <br> 4:       find the undirected edge $e = s, v$ <br> 5:       direct $e$ from $s$ to $v$ <br> 6:       add $v$ to $Q$ <br> 7:   end for <br> 8:   for each sink $s$ do <br> 9:       find the undirected edge $e = s, v$ <br> 10:      direct $e$ from $v$ to $s$ <br> 11:      add $v$ to $Q$ <br> 12:  end for <br> 13:  while $Q$ is not empty do <br> 14:      $u$ = dequeue $Q$ <br> 15:      if $u$.degree is equal to $u$.outdeg + $u$.indeg then <br> 16:         delete $u$ from $B$ <br> 17:      else if $u$.degree is 2 then <br> 18:         if $u$.indeg is 1 then <br> 19:            find the undirected edge $e = u, v$ <br> 20:            direct $e$ from $u$ to $v$ <br> 21:            add $v$ to $Q$ <br> 22:         else <br> 23:            find the undirected edge $e = u, v$ <br> 24:            direct $e$ from $v$ to $u$ <br> 25:            add $v$ to $Q$ <br> 26:         end if <br> 27:         delete $u$ from $B$ |

```
28:     else
29:         if u.indeg is 2 and u.outdeg is 1 then
30:             for each undirected edge e = u, v do
31:                 direct e from v to u
32:                 add u to Q
33:             end for
34:         else if u.indeg is 1 and u.outdeg is 2 then
35:             for each undirected edge e = u, v do
36:                 direct e from u to v
37:                 add v to Q
38:             end for
39:         else if u.indeg is 1 and u.degree-1 then
40:             find the undirected edge e = u, v
41:             direct e from u to v
42:             add v to Q
43:         else if u.outdeg is u.degree-1 then
44:             find the undirected edge e = u, v
45:             direct e from v to u
46:             add v to Q
47:         end if
48:         delete u from B
49:     end if
50:     if u.degree is larger than u.outdeg + u.indeg then
51:         add u to B
52:     end if
53:     search-Tree( B, Q )
54: end while
```

| Procedure 4: search-Tree($B$, $Q$) A helper function for the procedure assignDirections. |
|---|

1:    if $Q$ is empty and $B$ is not empty then
2:        pick a node $u$ from $B$ with maximum known directed edges
3:        if $u$.indeg in 2 or more then
4:            //*We know $u$ is a join, but we do not know which stream is the output stream.*
5:            choose an undirected edge $e = u, v$ randomly
6:            direct $e$ from $u$ to $v$
7:            add $v$ to $Q$
8:            for each remaining undirected edge $e = u, v$ do
9:                direct $e$ from $v$ to $u$
10:               add $v$ to $Q$
11:            end for
12:        else if $u$.outdeg is 2 or more then
13:            //*We know $u$ is a split, but we do not know which stream is the input stream.*
14:            choose an undirected edge $e = u, v$ randomly
15:            direct $e$ from $v$ to $u$
16:            add $v$ to $Q$
17:            for each remaining undirected edge $e = u, v$ do
18:                direct $e$ from $u$ to $v$
19:                add $v$ to $Q$
20:            end for
21:        else
22:            //*Since we could not take a definite decision on any node, this means that either it is the case with indeg=outdeg=1 or indeg=1, outdeg=0 or outdeg=1, indeg=0. It has to have at least one edge directed as it is in B.*
23:            $d = u$.degree
24:            Compute the numbers $^1S^{d-1}$ and $^{d-1}J^1$ for the minimum number of splits and joins that need to be assigned
25:            if $U(0, 1) < {}^1S^{d-1}/({}^1S^{d-1} + {}^{d-1}J^1)$ then
26:                //*declare $u$ to be a split*
27:                if $u$.indeg is 0 then
28:                    //*u needs an input stream.*
29:                    choose an undirected edge $e = u, v$ randomly
30:                    direct $e$ from $v$ to $u$
31:                    add $u$ to $Q$
32:                end if
33:                for each remaining undirected edge $e = u, v$ do
34:                    direct $e$ from $u$ to $v$
35:                    add $v$ to $Q$
36:                end for

```
37:        else
38:            //declare u to be a join
39:            if u.outdeg is 0 then
40:                //u needs an output stream.
41:                choose an undirected edge e = u, v randomly
42:                direct e from u to v
43:                add v to Q
44:            end if
45:            for each remaining undirected edge e = u, v do
46:                direct e from v to u
47:                add v to Q
48:            end for
49:        end if
50:    end if
51:    delete u from B
52: end if
```

SIMULATING STREAM COMPUTING SYSTEMS

FIELD OF THE INVENTION

Embodiments of the invention generally relate to information technology, and, more particularly, to stream computing.

BACKGROUND

Stream computing is an emerging computational model for performing complex operations on and across multi-source, high volume data-flows. Given that the deployment of the model has only started, the pool of mature applications employing this model is small, and therefore the availability of workloads for various types of applications is scarce. In addition, there is need for synthetic generation of large-scale workloads for evaluation of stream computing applications at scale.

SUMMARY

In one aspect of the present invention, techniques for simulating stream computing systems are provided. An exemplary computer-implemented method for generating a synthetic workload for stream computing can include steps of generating an undirected graph that meets a node degree distribution parameter, obtaining a user-defined parameter for at least one feature for at least one stream computing application, and manipulating the undirected graph to generate a synthetic workload for stream computing in compliance with the user-defined parameter for the at least one feature for the at least one stream computing application.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating example stream computing graphs, according to an embodiment of the present invention;

FIG. 2 is a diagram illustrating example stream computing graphs, according to an embodiment of the present invention;

FIG. 3 is a diagram illustrating example stream computing graphs, according to an embodiment of the present invention;

FIG. 4 is a diagram illustrating example stream computing graphs, according to an embodiment of the present invention;

FIG. 5 is a diagram illustrating an algorithm, according to an embodiment of the present invention;

FIG. 6 is a diagram illustrating an algorithm, according to an embodiment of the present invention;

FIG. 7 is a diagram illustrating an algorithm, according to an embodiment of the present invention;

DETAILED DESCRIPTION

Figures 8, 9:
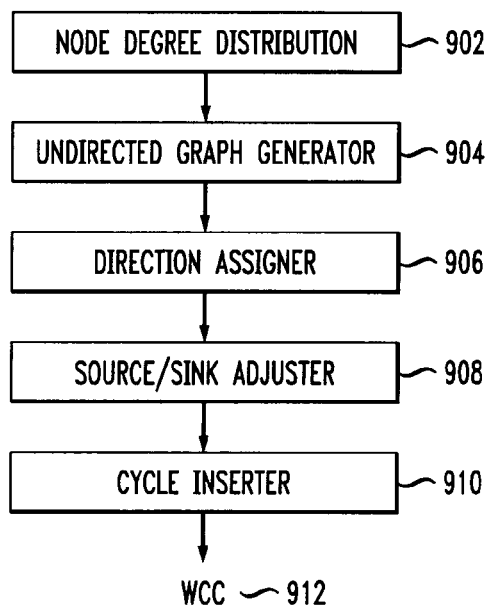
FIG. 8 is a diagram illustrating an algorithm, according to an embodiment of the present invention.
FIG. 9 is a block diagram illustrating an example embodiment, according to an aspect of the invention.

As described herein, an aspect of the present invention includes a flexible workload generator for simulating stream computing systems. In an example embodiment of the invention, the framework extends known random graph generation concepts with stream computing specific features, providing researchers with realistic input stream graphs and thus allowing them to focus on system development, optimization and analysis.

In at least one embodiments of the invention, a number of "knobs" (or analogous components) are provided that can be manipulated to produce a set of graphs that would look like a typical stream computing workload. Additionally, in covering a disparity of potential applications, the framework in accordance with at least one embodiment of the invention exhibits high user-controlled configurability.

As detailed herein, an aspect of the invention includes producing synthetic workloads for stream computing systems. The framework allows researchers to synthesize stream computing workloads with quantifiable levels of different features of stream computing applications. The supported features can include, for example, firing rules that can be applied to multi-input kernels, types of sensor streams (and their rate behaviors), heterogeneity of the computational requirements of kernels, numbers of sources and sinks, relative proportions of kernels categories, and cycles of given lengths.

A user supplies a set of specifications for features typically seen in stream computing applications, and an embodiment of the invention can include responding by generating a set of graphs that look like a typical stream computing workload.

As noted, providing a user with a number of "knobs" that can be manipulated to produce a set of graphs that would look like a typical stream computing workload can include the following steps. A node degree distribution D is produced based on a table of user-defined parameters. A node degree distribution indicates how many nodes have a particular number of neighbors. Also, given D, an undirected graph UG can be generated using an undirected graph generator (for example, that in FIG. 1). Further, given UG, a directed graph G can be generated using a procedure that meets those requirements given in the user-defined parameters table. Note that the degree distribution D does not capture all requirements given in such tables. Additionally, given G, another directed graph Gc can be generated that contains a cycle of given length as specified by a user. Accordingly, Gc is a graph that corresponds to one WCC (weakly connected component).

In at least one embodiment of the invention, the synthetic workload generator is generic enough to synthesize various workloads that might be encountered in a typical stream computing system. Therefore, an aspect of the invention includes design features that are programmable by a user. A typical workload executing on a large stream computing system can have thousands of applications executing thereon. A subset of these applications will communicate with each other, and within one application, there may be thousands of communicating kernels. Accordingly, a typical synthetic workload may look like a forest of weakly connected components, with each weakly connected component (WCC) representing one user application. It is also expected that a given application can have several instances running in the system. This may happen, for example, because a given application is invoked repeatedly (in parallel) to operate on different subsets of the same data.

FIG. 1 is a diagram illustrating example stream computing graphs, according to an embodiment of the present invention. These example stream computing graphs were generated with a target vertex count of 20, maximum degree of four, and an average degree of two. For graph 102, there is one source and one sink. For graph 104, there are three sources and three sinks. Three different kinds of vertices (called kernels in stream computing) can be seen in these graphs: filter, split and join. A filter is characterized by a single input stream and a single output stream. A join is characterized by multiple input streams and a single output stream. A split includes a single input stream and multiple output streams. Note also that both join and split may do more than just literal joining and splitting. The particular mix of kernels that a given execution of the workload generator produces depends on whether the user wants the graph to have a particular degree distribution or certain communication patterns. Note that for both graph 102 and graph 104, the actual node count is 21.

The kernels within an application can have different types and different firing rules. The user can specify a set of different firing rules that will be applied to the kernels. Such rules are important for multi-input kernels, where an output might be produced only when all inputs have had new data sets, as soon as any input has had a new data set, or as soon as a particular input has a new data set. In at least one embodiment of the invention, the workload generator queries a user to specify what percentage of the multi-input kernels will have a given firing rule.

As described herein, the generator provides a user two ways of specifying communications among the kernels of a given WCC. The user can specify a degree distribution for the vertices, and the user can also specify the percentage of vertices that are to be involved in one of the following operations: join, split and filter. For example, if a user specifies that x % of vertices should be set up in a linear fashion, the generator ensures that there is a linear chain of vertices with length as close to x % of total vertices as possible. Similarly, if a user specifies that x % (for example, a number N) of vertices should be in a single join, the generator attempts to ensure that there is a group of vertices where N−1 vertices are sending data to exactly one vertex.

Conversely, if a user specifies that x % (for example, a number N) of vertices should be in a split, the generator attempts to ensure that there is a group of vertices where exactly one vertex is sending data to N−1 vertices. Note that these specifications are stated on a per-component basis. The user can specify percentages for all three templates (that is, join, split, and linear) and the workload generator will generate a graph accordingly. By way of example, the user can specify these details in a table such as Table 1 (below), which illustrates user specifications for a particular kernel mix. In this example, the user has specified communication patterns for 40% of the vertices. The tool randomly connects the remaining 60%.

| Num vertices | Type   | Num inputs | Num outputs |
|--------------|--------|------------|-------------|
| 10%          | join   | 3          | 1           |
| 10%          | join   | 2          | 1           |
| 15%          | filter | 1          | 1           |
| 5%           | split  | 1          | 4           |

FIG. 2 is a diagram illustrating example stream computing graphs, according to an embodiment of the present invention. By way of illustration, FIG. 2 depicts effect on a generated graph when the kernel mix changes. Graph 202 was generated when the user asked that 90% of the vertices be filters with one source and one sink. On the other hand, graph 204 was generated when the user asked that 100% of the vertices be non-filters (that is, either splits or joins) with one source and one sink.

An aspect of the invention also includes sensor stream modeling. In a given example scenario, each application can be driven by several sensor streams. As a part of generating a synthetic workload, a "behavior" for each sensor stream can be generated, as further detailed herein.

Note that the specificities of the sensor rates and stream sizes will heavily depend on the characteristics of the application that is modeled by a WCC of the workload graph. Serving the objective of high configurability, the generator in an example embodiment of the invention can provide for a wide range of sensor stream modeling options corresponding to many different application types. It is the responsibility of the end user to pick a configuration that closely matches the actual sensor stream patterns for the application of interest.

Additionally, users can specify the rate pattern of "primal" streams entering a given WCC. The primal streams are the ones entering a WCC from the outside world, and in the computational graph abstraction, they are denoted by vertices labeled as "sensors." As part of the workload synthesis, in an embodiment of the invention, the generator allows the user the ability to specify, for each sensor, the distribution and the related parameter values (average, variance, etc.) governing the rate of data stream it produces.

As detailed herein, the term push sensor streams refers to streams that are "pushed" incrementally to memory and, as such, it is not guaranteed that a stream will be available for processing by the source kernel every time the latter becomes idle. Such a model corresponds to applications involving capturing of real-time data/events, such as surveillance or network monitoring. In contrast, pull sensor streams guarantee the existence of a stream to process, every time the host processor attempts to have a stream input into the kernel graph of a specific task.

The pull streams can be used to model tasks that process stored data, such as data mining over bulk data. Note that, in an example embodiment of the invention, the generator does not limit the user to using one of the two models for a specific kernel graph, thus allowing the combination of push and pull sensor streams (for example, for modeling a network monitoring application that compares real-time traffic against stored malicious traffic patterns).

As used herein, the terms "push" and "pull" for sensor streams refer to the way sensor streams are loaded on a stream's memory, not the method used to feed them to source kernels. It is the source kernel's program code that fetches streams from the streams data, whenever such are available.

When examining push sensor streams flowing along a specific sensor, an embodiment of the invention includes differentiating between the following two cases with reference to statistical independence between any pair of streams:

1. Push streams with statistically independent data inter-arrival times, such as, for example, inventory tracking data or aggregation of customer-input to a call center over long-time intervals (in general, streams that aggregate data input from a large number of independent sources).

2. Push streams with statistically dependent data inter-arrival times: streams exhibiting enterprise fall in this category, such as, for instance, road-traffic management data or any type of logged data exhibiting temporal dependence (web site visits on a daily basis, etc.). Constant-rate push streams are a special case within this category.

For push sensor streams, the generator, in accordance with at least one embodiment of the invention, allows the user to model the following:

Sensor streams that are pair-wise statistically independent; and

Sets of sensor streams that are statistically dependent, such as, for example, the stream pairs of a pair of synchronized audio and video sources or the streams corresponding to the network traffic of a group of network segments that share a common bottleneck link.

While many applications will work with fixed sized streams (for example, video frames of constant resolution), others may generate variable sized streams (for example, monitored network packets). To provide the capability of stream-size dependant performance evaluation, the generator, in at least one embodiment of the invention, provides the user the ability to accordingly model the stream size along a sensor stream by specifying either a fixed stream size value or a distribution (and its parameter values) that will be sampled to randomly generate stream size values.

Additionally, it is possible that the systems adopting the stream computing model may have a variety of hardware computational nodes. For each such node, an aspect of the invention includes allowing the user to specify how greatly and with what properties (for example, probability distribution) the execution times of the different kernels vary for any given node. The user can specify task heterogeneity by specifying the co-efficient of variation that must be observed by the simulated execution times. The user can specify one of the following distributions for the estimated kernel processing times: Pareto and Gamma. The Gamma distribution is used because of its generality and the Pareto distribution is used because it has been shown that task processing times are often Pareto distributed or otherwise have high variability.

In at least one embodiment of the invention, the number of sources and sinks are specified separately for a particular WCC. The workload generator allows the user to specify a probability distribution and its parameters to sample the values of the number of sources and sinks for a given WCC.

By way of example, let $N_i^{srcs}$ be the number of sensors sampled from a user supplied distribution for a given WCC i. To ensure that the number of sensors in the WCC i is exactly $N_i^{srcs}$, the vertices with zero in-degree are identified and declared as tentative sources. If the number of tentative sources is less than $N_i^{srcs}$, this WCC is discarded from inclusion in the final graph. Otherwise, $N_i^{srcs}$ tentative sources are arbitrarily selected and labeled as sources. For each remaining tentative source vertex v, an edge is added originating from a randomly chosen source to v.

A similar procedure can be performed to ensure that the number of sinks in the WCC i is exactly $N_i^{sin\ ks}$. As before, let $N_i^{sin\ ks}$ be the number of sinks sampled from a user supplied distribution for a given WCC i. To ensure that the number of sinks in the WCC i is exactly $N_i^{sin\ ks}$, the vertices with zero out-degree are identified and declared as tentative sinks. If the number of tentative sinks is less than $N_i^{sin\ ks}$, this WCC is discarded from inclusion in the final graph. Otherwise, $N_i^{sin\ ks}$ tentative sinks are arbitrarily selected and labeled as sinks. For each remaining tentative sink vertex v, an edge is added originating from v to a randomly chosen sink.

As detailed herein, at least one embodiment of the invention includes supporting three different types of kernels: filter, split and join. The relative proportions of kernels that a given execution of the workload generator produces depend on how the user specifies the communication patterns. In case degree distributions are specified, a random directed graph is generated that meets the given degree distributions. Also, each vertex is visited and declared as one of the aforementioned three types depending upon the numbers of inputs and outputs. In case there is a vertex, m, with multiple inputs and multiple outputs (thereby not falling into any one of three types of filter, join and split), an embodiment of the invention includes transforming the vertex into two vertices u and v such that all inputs of m become inputs of u, all outputs of m become outputs of v, and there is an edge from u to v.

A typical stream computing workload can have several instances of feedback therein. To simulate such feedback, the workload generator allows users a method to introduce cycles in the workload. As detailed herein, an example embodiment of the invention includes checking if there are any pre-existing cycles of length L. This pre-existence check employs a depth-first search, which necessitates the selection of a "source vertex." A maximum out-degree vertex s can be employed for this purpose. The pre-existence check determines all cycles of length L, if any. Any cycles of length not equal to L are removed by removing an appropriate edge. If no cycle of length L is found, such an edge (a back edge) is added that will give a cycle of length L.

The algorithm (as illustrated herein) determines, for every vertex y, the longest path from vertex s to y using a modified version of shortest paths algorithm. The modification simplifies the algorithm because all edge weights are 1 and there are no cycles. Let $P^{longest}$ be the set of all such paths. A path from s to z whose length is L and in-degree of z is 1 is selected from $P^{longest}$. Because an intention is to add a back edge from z to s, it is known that z will have multiple outputs after this back edge is added. Therefore, in an example embodiment, it is ensured that z has only one input so as to not run into a case where there is a vertex with multiple inputs and multiple outputs.

Additionally, the back edge is added z to s, creating a cycle of length L. It is possible that all paths in $P^{longest}$ have lengths shorter than L. In such a case, the algorithm returns the longest possible cycle. It is also possible that no cycle can be added to the graph. In that case, an error is reported.

FIG. 3 is a diagram illustrating example stream computing graphs, according to an embodiment of the present invention. By way of illustration, FIG. 3 depicts an example of the process detailed above. WCC graph 304 was produced from the WCC graph 302 by adding a cycle of length five. The numbers in the vertices have been added for referencing purposes. The cycle in question is {source 1, filter 7, filter 13, join 19, split 20, source 1}. Note that the process has added three other cycles as well; namely, {source 1, join 19, split 20, source 1}, {source 1, filter 4, join 19, split 20, source 1}, and {source 1, filter 6, filter 11, join 19, split 20, source 1}. The process only guarantees that there will be a cycle of length L, not that there will be no smaller cycles. FIG. 4, for example, shows the resulting graphs when cycles of length 6 and 7 are added.

At least one embodiment of the invention includes employing a graph generator to produce a basic undirected graph that is later converted into a WCC. The degree sequence fed to the graph generator is calculated based on communication requirements (as described herein). If no edge directions are imposed by the communication requirements, the edge directions are assigned randomly. The edge assignment process flows forward from the sensors, and backwards from the sinks, assigning directions to all of the filters first. For all kernels with a degree of more than two, it is determined if the kernel should be a join with multiple input streams or a split with multiple output streams. One of these options can be chosen, for example, based on probability values such as those given in Table 1. By way of illustration, let $^nS^n$ be a user-specified percentage of nodes that split a given input stream into n output streams. Similarly, let $^nJ^1$ be a user-specified percentage of nodes that join n input streams into one output stream. Also, let u.indeg be the in-degree of vertex u, and u.outdeg be its out-degree.

The procedure for generating a forest of WCCs includes user specification of $N_{total}^{knls}$, the total number of kernels that should be present in the final stream graph; $N_{avg}^{knls}$, the average number of kernels that should be present in a WCC; $N_{max}^{srcs}$, the maximum number of sources that could drive a WCC; and $N_{max}^{sin\ ks}$, the maximum number of sinks that could be driven by a WCC. The method for producing a WCC (as detailed herein) can be invoked multiple times using parallel threads. Each thread is passed randomly with sampled values for $N_i^{knls}$, the average number of kernels that should be present in this WCC; $N_i^{srcs}$, the number of sources that drive this WCC; $N_i^{sin\ ks}$, the number of sinks that are driven by this WCC; D, the distribution of degrees for the vertices of this WCC; and $L_i^{cyc}$, length of a cycle that is required to be present in this WCC. $L_i^{cyc}$ can be some function of other input parameters or a constant or specified in a file that can be read by the program.

FIG. 4 is a diagram illustrating example stream computing graphs, according to an embodiment of the present invention. By way of illustration, FIG. 4 depicts effect on a generated graph when the user-specified cycle length changes. WCC 402 was produced from the acyclic WCC 302 in FIG. 3 by adding a cycle of length 6. WCC 404 was produced from the acyclic WCC 302 in FIG. 3 by adding a cycle of length 7.

FIG. 5 is a diagram illustrating an algorithm, according to an embodiment of the present invention. By way of illustration, FIG. 5 depicts the procedure 502, as described herein, for finding if a graph G contains a cycle of length L. All cycles of length L are returned, and all cycles of length not equal to L are removed by removing an appropriate edge.

FIG. 6 is a diagram illustrating an algorithm, according to an embodiment of the present invention. By way of illustration, FIG. 6 depicts the procedure 602, as described herein, for adding an edge in an acyclic graph G to produce a cycle of length L.

FIG. 7 is a diagram illustrating an algorithm, according to an embodiment of the present invention. By way of illustration, FIG. 7 depicts the procedure 702, as described herein, for converting a given undirected graph into a directed graph.

FIG. 8 is a diagram illustrating an algorithm, according to an embodiment of the present invention. By way of illustration, FIG. 8 depicts a helper function for the procedure 802 assignDirections.

FIG. 9 is a block diagram illustrating an example embodiment, according to an aspect of the invention. By way of illustration, FIG. 9 depicts a node degree distribution 902 (for example, user-specified node degree distribution) to an undirected graph generator module 904, which then provides input to a direction assigner module 906. The direction assigner module provides input to a source/sink adjuster module 908, which then provides input to a cycle inserter module 910, which ultimately produces a WCC 912. Accordingly, FIG. 9 depicts components used in accordance with at least one embodiment of the invention, as detailed herein.

Figure 10:
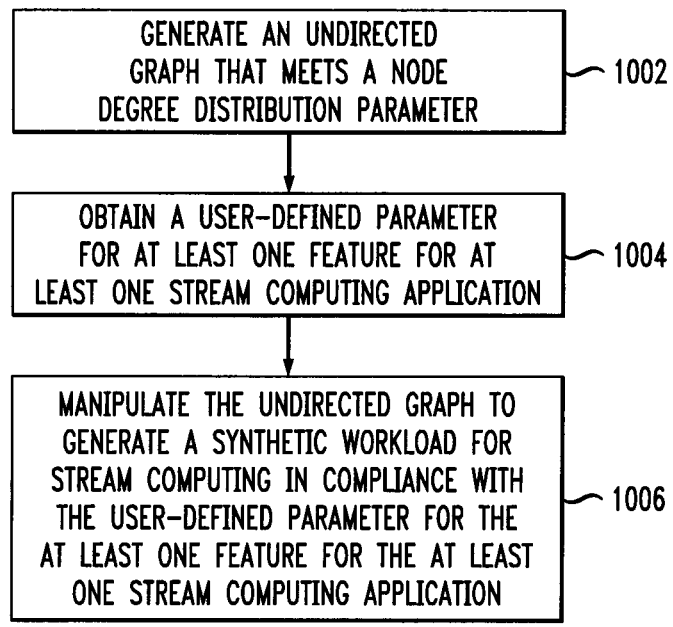
FIG. 10 is a flow diagram illustrating techniques for generating a synthetic workload for stream computing, according to an embodiment of the invention.

FIG. 10 is a flow diagram illustrating techniques for generating a synthetic workload for stream computing, according to an embodiment of the present invention. Step 1002 includes generating an undirected graph that meets node degree distribution parameter (user-specified or implied by a user). Step 1004 includes obtaining a user-defined parameter for at least one feature for at least one stream computing application. As described herein, the at least one feature for at least one stream computing application can include, for example, at least one firing rule that can be applied to multi-input kernels, at least one type of sensor stream and corresponding rate behavior, heterogeneity of at least one computational requirements of kernels, the number of sources and sinks, as well as relative proportion of kernels categories and cycles of given lengths.

Step 1006 includes manipulating the undirected graph to generate a synthetic workload for stream computing in compliance with the user-defined parameter for the at least one feature for the at least one stream computing application. Manipulating the undirected graph to generate a synthetic workload for stream computing can include generating a set of graphs representing a stream computing workload. Additionally, manipulating the undirected graph to generate a synthetic workload for stream computing can include producing a node degree distribution, D, based on the user defined parameter, wherein the node degree distribution indicates how many nodes have a particular number of neighbors.

As detailed herein, given D, an embodiment of the invention includes generating an undirected graph, UG, using a graph generator. Also, given UG, an embodiment of the invention includes generating a directed graph, G, that is in compliance with the user-defined parameter. Further, given G, an embodiment of the invention includes generating to another directed graph, Gc, that contains a cycle of given user-specified length. Accordingly, the directed graph Gc is a graph that corresponds to one weakly connected component (WCC).

The techniques depicted in FIG. 10 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include an undirected graph generator module, a direction assigner module, a source/sink adjuster module, and a cycle inserter module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 10 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 11:
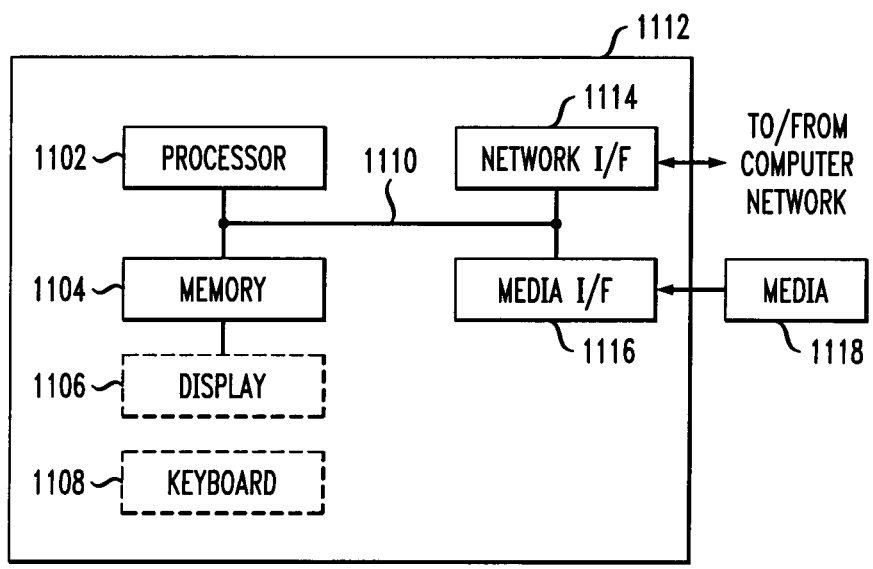
FIG. 11 is a system diagram of an exemplary computer system on which at least one embodiment of the invention can be implemented.

Additionally, an aspect of the present invention can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1102. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, extending known random graph generation concepts with stream computing specific features, providing researchers with realistic input stream graphs to facilitate system development, optimization and analysis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a synthetic workload for stream computing, wherein the method comprises:
generating an undirected graph that meets a node degree distribution parameter;
obtaining a user-defined parameter for at least one feature for at least one stream computing application, wherein the at least one feature comprises at least one type of sensor stream and corresponding rate behavior; and
manipulating the undirected graph to generate a synthetic workload for stream computing in compliance with the user-defined parameter for the at least one feature for the at least one stream computing application;
wherein at least one of the steps is carried out by a computer device.

2. The method of claim 1, wherein manipulating the undirected graph to generate a synthetic workload for stream computing comprises generating a set of graphs representing a stream computing workload.

3. The method of claim 1, wherein manipulating the undirected graph to generate a synthetic workload for stream computing comprises producing a node degree distribution, D, based on the user defined parameter, wherein the node degree distribution indicates how many nodes have a particular number of neighbors.

4. The method of claim 3, further comprising:
given D, generating an undirected graph, UG, using a graph generator.

5. The method of claim 4, further comprising:
given UG, generating a directed graph, G, that is in compliance with the user-defined parameter.

6. The method of claim 5, further comprising:
given G, generating another directed graph, Gc, that contains a cycle of given user-specified length.

7. The method of claim 6, wherein the directed graph Gc is a graph that corresponds to one weakly connected component (WCC).

8. The method of claim 1, wherein the at least one feature for at least one stream computing application further comprises at least one firing rule that can be applied to multi-input kernels.

9. The method of claim 1, wherein the at least one feature for at least one stream computing application further comprises heterogeneity of at least one computational requirements of kernels.

10. The method of claim 1, wherein the at least one feature for at least one stream computing application further comprises number of sources and sinks.

11. The method of claim 1, wherein the at least one feature for at least one stream computing application further comprises relative proportion of kernels categories and cycles of given lengths.

12. An article of manufacture comprising a non-transitory computer readable storage medium having computer readable instructions tangibly embodied thereon which, when implemented, cause a computer to carry out a plurality of method steps comprising:
generating an undirected graph that meets a node degree distribution parameter;
obtaining a user-defined parameter for at least one feature for at least one stream computing application, wherein the at least one feature comprises at least one type of sensor stream and corresponding rate behavior; and
manipulating the undirected graph to generate a synthetic workload for stream computing in compliance with the user-defined parameter for the at least one feature for the at least one stream computing application.

13. The article of manufacture of claim 12, wherein manipulating the undirected graph to generate a synthetic workload for stream computing comprises producing a node degree distribution, D, based on the user defined parameter, wherein the node degree distribution indicates how many nodes have a particular number of neighbors.

14. The article of manufacture of claim 13, wherein the computer readable instructions which, when implemented, further cause a computer to carry out a method step comprising:
given D, generating an undirected graph, UG, using a graph generator.

15. The article of manufacture of claim 14, wherein the computer readable instructions which, when implemented, further cause a computer to carry out a method step comprising:
given UG, generating a directed graph, G, that is in compliance with the user-defined parameter.

16. The article of manufacture of claim 15, wherein the computer readable instructions which, when implemented, further cause a computer to carry out a method step comprising:
given G, generating another directed graph, Gc, that contains a cycle of given user-specified length.

17. The article of manufacture of claim 16, wherein the directed graph Gc is a graph that corresponds to one weakly connected component (WCC).

18. A system for generating a synthetic workload for stream computing, comprising:
at least one distinct software module, each distinct software module being embodied on a tangible computer-readable medium;
a memory; and
at least one processor coupled to the memory and operative for:
generating an undirected graph that meets a node degree distribution parameter;
obtaining a user-defined parameter for at least one feature for at least one stream computing application, wherein the at least one feature comprises at least one type of sensor stream and corresponding rate behavior; and
manipulating the undirected graph to generate a synthetic workload for stream computing in compliance with the user-defined parameter for the at least one feature for the at least one stream computing application.

19. The system of claim 18, wherein the at least one processor coupled to the memory operative for manipulating the undirected graph to generate a synthetic workload for stream computing is further operative for producing a node degree distribution, D, based on the user defined parameter, wherein the node degree distribution indicates how many nodes have a particular number of neighbors.

20. The system of claim 19, wherein the at least one processor coupled to the memory is further operative for:
given D, generating an undirected graph, UG, using a graph generator.

21. The system of claim 20, wherein the at least one processor coupled to the memory is further operative for:
given UG, generating a directed graph, G, that is in compliance with the user-defined parameter.

22. The system of claim 21, wherein the at least one processor coupled to the memory is further operative for:
given G, generating another directed graph, Gc, that contains a cycle of given user-specified length.

23. The system of claim 22, wherein the directed graph Gc is a graph that corresponds to one weakly connected component (WCC).

\* \* \* \* \*